United States Patent
Keller

(10) Patent No.: US 7,290,474 B2
(45) Date of Patent: Nov. 6, 2007

(54) SYSTEM FOR RAPIDLY STOPPING A SPINNING TABLE SAW BLADE

(75) Inventor: David V. Keller, Jackson, TN (US)

(73) Assignee: Black & Decker Inc., Newark, DE (US)

( * ) Notice: Subject to any disclaimer, the term of this patent is extended or adjusted under 35 U.S.C. 154(b) by 385 days.

(21) Appl. No.: 11/025,356

(22) Filed: Dec. 29, 2004

(65) Prior Publication Data

US 2006/0096425 A1    May 11, 2006

Related U.S. Application Data

(63) Continuation-in-part of application No. 10/836,132, filed on Apr. 29, 2004, now abandoned.

(60) Provisional application No. 60/533,192, filed on Dec. 30, 2003, provisional application No. 60/466,199, filed on Apr. 29, 2003.

(51) Int. Cl.
*B23D 45/06* (2006.01)
*B26D 7/22* (2006.01)

(52) U.S. Cl. .............. 83/477.2; 83/639.4; 83/DIG. 1; 192/130

(58) Field of Classification Search ............ 83/DIG. 1, 83/477.2, 209, 210, 639.1, 639.2, 639.4; 192/116.5, 129 R, 130, 131 R, 131 H, 138
See application file for complete search history.

(56) References Cited

U.S. PATENT DOCUMENTS

| | | | |
|---|---|---|---|
| 299,619 A | 6/1884 | Carson | |
| 408,790 A | 8/1889 | Butler | |
| 411,925 A | 10/1889 | Linderman | |
| 714,098 A | 11/1902 | Caldwell | |
| 1,476,238 A | 12/1923 | Bump | |
| 1,804,764 A | 5/1931 | Grant | |
| 2,109,976 A | 3/1938 | Pierce, Jr. | 177/311 |
| 2,121,069 A | 6/1938 | Collins | 143/36 |
| 2,146,906 A | 2/1939 | Moller | 77/5 |

(Continued)

FOREIGN PATENT DOCUMENTS

CN    2378150 Y    5/2000

(Continued)

OTHER PUBLICATIONS

"Instruction Manual Redeye® 1800W 184mm (7 1/4") Circular Saw with Laser Line Generator, Model LS5000," GMC Global Machinery Company, 45-55 South Centre Road, Melbourne Airport, Victoria 3045, Australia; 14 pages.

(Continued)

*Primary Examiner*—Kenneth E. Peterson
*Assistant Examiner*—Phong Nguyen
(74) *Attorney, Agent, or Firm*—Adan Ayala

(57) ABSTRACT

A system for stopping a spinning table saw blade is comprised of a pin assembly disposed adjacent to a saw blade assembly for stopping a spinning saw blade. A receiving block is disposed on a side of the saw blade opposing the pin assembly for receiving the tip of the pin assembly. A driving assembly is coupled to the pin assembly for driving the pin assembly into the spinning saw blade into the receiving block. Finally, a sensing assembly is coupled to at least one of the saw blade assembly and the driving assembly for sensing encroachment of a user's hand in a pre-defined zone. In use, upon sensing a user's hand the sensing assembly signals the driving assembly to stop the spinning saw blade by driving the pin assembly through the saw blade and into the receiving block.

11 Claims, 6 Drawing Sheets

U.S. PATENT DOCUMENTS

| | | | |
|---|---|---|---|
| 2,299,262 A | 10/1942 | Uremovich | 143/36 |
| 2,307,820 A | 1/1943 | Butters | 143/168 |
| 2,357,194 A | 8/1944 | Hazelton et al. | 164/47 |
| 2,407,845 A | 9/1946 | Nemeyer | 116/124 |
| 2,465,000 A | 3/1949 | Turner | 143/132 |
| 2,488,947 A | 11/1949 | Vavrik | 143/43 |
| 2,518,684 A | 8/1950 | Harris | 143/45 |
| 2,557,029 A | 6/1951 | Griffin | 88/39 |
| 2,806,492 A | 9/1957 | Becker | 143/168 |
| 2,850,054 A | 9/1958 | Eschenburg | 143/36 |
| 2,855,679 A | 10/1958 | Gibble | 33/46 |
| 3,005,477 A | 10/1961 | Sherwen | 143/47 |
| 3,011,529 A | 12/1961 | Copp | 143/36 |
| 3,013,592 A | 12/1961 | Ambrosio et al. | 143/36 |
| 3,124,178 A | 3/1964 | Packard | 143/36 |
| 3,179,458 A | 4/1965 | Sconzo | 292/341.15 |
| 3,344,819 A | 10/1967 | Mitchell | 143/36 |
| 3,572,937 A | 3/1971 | Baldwin | 356/110 |
| 3,597,091 A | 8/1971 | Bowker | 356/106 |
| 3,635,108 A | 1/1972 | Prince | 82/1 |
| 3,713,746 A | 1/1973 | Luthy | 408/8 |
| 3,728,027 A | 4/1973 | Watanabe | 356/13 |
| 3,780,777 A | 12/1973 | Davies | 144/3 N |
| 3,837,757 A | 9/1974 | Levine | 408/14 |
| 3,854,836 A | 12/1974 | Weissman | 408/14 |
| 3,891,039 A | 6/1975 | Lagerstrom | 175/40 |
| 3,970,359 A | 7/1976 | Starkweather | 350/7 |
| 3,972,582 A | 8/1976 | Oosaka et al. | 350/7 |
| 3,976,384 A | 8/1976 | Matthews et al. | 356/200 |
| 4,046,985 A | 9/1977 | Gates | 219/121 L |
| 4,078,869 A | 3/1978 | Honeycutt | 408/16 |
| 4,184,394 A | 1/1980 | Gjerde | 83/477.1 |
| 4,255,056 A | 3/1981 | Peterson | 356/401 |
| 4,257,297 A | 3/1981 | Nidbella | 83/471.3 |
| 4,271,747 A * | 6/1981 | Bendler et al. | 411/20 |
| 4,319,403 A | 3/1982 | Stearns | 33/185 R |
| 4,338,723 A | 7/1982 | Benjamin | 33/174 L |
| 4,383,373 A | 5/1983 | Couturier | 33/286 |
| 4,386,532 A | 6/1983 | Benjamin | 73/862.04 |
| 4,413,662 A | 11/1983 | Gregoire et al. | 144/356 |
| 4,438,567 A | 3/1984 | Raiha | 33/286 |
| 4,447,956 A | 5/1984 | Chung | 33/172 D |
| 4,450,627 A | 5/1984 | Morimoto | 30/391 |
| 4,468,992 A | 9/1984 | McGeehee | 83/56 |
| 4,469,318 A | 9/1984 | Slavic | 269/91 |
| 4,469,931 A | 9/1984 | Macken | 219/121 LG |
| 4,503,740 A | 3/1985 | Brand et al. | 83/521 |
| 4,534,093 A | 8/1985 | Jahnke et al. | 29/26 A |
| 4,566,202 A | 1/1986 | Hamar | 33/286 |
| 4,581,808 A | 4/1986 | Lawson et al. | 29/558 |
| 4,589,208 A | 5/1986 | Iwasaki et al. | 30/376 |
| 4,598,481 A | 7/1986 | Donahue | 33/288 |
| 4,607,555 A | 8/1986 | Erhard | 83/471.2 |
| 4,651,732 A | 3/1987 | Frederick | 128/303 R |
| 4,676,130 A | 6/1987 | Nutt | 83/155 |
| 4,723,911 A | 2/1988 | Kurtz | 433/27 |
| 4,725,933 A | 2/1988 | Houk | 362/287 |
| 4,775,205 A | 10/1988 | Muramatsu | 350/6.8 |
| 4,803,976 A | 2/1989 | Frigg et al. | 128/92 |
| 4,805,500 A | 2/1989 | Saito et al. | 83/277 |
| 4,817,839 A | 4/1989 | Weissman | 225/2 |
| 4,820,911 A | 4/1989 | Arackellian et al. | 235/467 |
| 4,833,782 A | 5/1989 | Smith | 30/392 |
| 4,836,671 A | 6/1989 | Bautista | 356/1 |
| 4,885,965 A | 12/1989 | Veissman | 83/100 |
| 4,885,967 A | 12/1989 | Bell et al. | 83/520 |
| 4,887,193 A | 12/1989 | Dieckmann | 362/89 |
| 4,932,580 A * | 6/1990 | Pfister et al. | 227/10 |
| 4,934,233 A | 6/1990 | Brundage et al. | 83/397 |
| 4,945,797 A | 8/1990 | Hahn | 83/75.5 |
| 4,964,449 A | 10/1990 | Conners | 144/286 R |
| 4,976,019 A | 12/1990 | Kitamura | 29/26 A |
| 4,978,246 A | 12/1990 | Quenzi et al. | 404/84 |
| 5,013,317 A | 5/1991 | Cole et al. | 606/96 |
| 5,031,203 A | 7/1991 | Trecha | 378/205 |
| 5,038,481 A | 8/1991 | Smith | 30/392 |
| 5,052,112 A | 10/1991 | MacDonald | 33/263 |
| 5,148,232 A | 9/1992 | Duey et al. | 356/152 |
| 5,159,864 A | 11/1992 | Wedemeyer et al. | 83/13 |
| 5,159,869 A | 11/1992 | Tagliaferri | 83/862 |
| 5,161,922 A | 11/1992 | Malloy | 408/14 |
| 5,203,650 A | 4/1993 | McCourtney | 408/1 R |
| 5,207,007 A | 5/1993 | Cucinotta et al. | 33/640 |
| 5,212,720 A | 5/1993 | Landi et al. | 378/206 |
| 5,267,129 A | 11/1993 | Anderson | 362/96 |
| 5,283,808 A | 2/1994 | Cramer et al. | 378/206 |
| 5,285,708 A | 2/1994 | Bosten et al. | 83/520 |
| 5,316,014 A | 5/1994 | Livingston | 128/754 |
| 5,320,111 A | 6/1994 | Livingston | 128/754 |
| 5,357,834 A | 10/1994 | Ito et al. | 83/471.3 |
| 5,365,822 A | 11/1994 | Stapleton et al. | 83/745 |
| 5,375,495 A | 12/1994 | Bosten et al. | 83/520 |
| 5,387,969 A | 2/1995 | Marantette | 356/4.5 |
| 5,426,687 A | 6/1995 | Goodall et al. | 378/206 |
| 5,439,328 A | 8/1995 | Haggerty et al. | 408/1 R |
| 5,446,635 A | 8/1995 | Jehn | 362/259 |
| 5,461,790 A | 10/1995 | Olstowski | 30/391 |
| 5,481,466 A | 1/1996 | Carey | 364/474.09 |
| 5,488,781 A | 2/1996 | Van Der Horst | 33/617 |
| 5,495,784 A | 3/1996 | Chen | 83/471.2 |
| 5,522,683 A | 6/1996 | Kakimoto et al. | 408/13 |
| 5,529,441 A | 6/1996 | Kosmowski et al. | 408/1 R |
| 5,546,840 A | 8/1996 | Supe-Dienes | 83/478 |
| 5,579,102 A | 11/1996 | Pratt et al. | 356/3.12 |
| 5,593,606 A | 1/1997 | Owen et al. | 219/121.71 |
| 5,644,616 A | 7/1997 | Landi et al. | 378/206 |
| 5,661,775 A | 8/1997 | Cramer et al. | 378/206 |
| 5,662,017 A | 9/1997 | Mellon | 83/169 |
| 5,667,345 A | 9/1997 | Wiklund | 408/1 R |
| 5,675,899 A | 10/1997 | Webb | 30/390 |
| 5,720,213 A | 2/1998 | Sberveglieri | 83/471.3 |
| 5,741,096 A | 4/1998 | Olds | 408/1 R |
| 5,777,562 A | 7/1998 | Hoffman | 340/870.07 |
| 5,782,842 A | 7/1998 | Kloess et al. | 606/130 |
| 5,784,792 A | 7/1998 | Smith | 33/227 |
| 5,797,670 A | 8/1998 | Snoke et al. | 362/119 |
| 5,819,625 A | 10/1998 | Sberveglieri | 83/471.3 |
| 5,835,517 A | 11/1998 | Jayaraman et al. | 372/50 |
| 5,835,519 A | 11/1998 | Tsukamoto et al. | 372/55 |
| 5,862,727 A | 1/1999 | Kelly | 83/13 |
| 5,911,482 A | 6/1999 | Campbell et al. | 30/390 |
| 5,918,523 A | 7/1999 | Cutter | 83/520 |
| 5,943,931 A | 8/1999 | Stumpf et al. | 83/468.2 |
| 5,943,932 A | 8/1999 | Sberveglieri | 83/471.3 |
| 5,949,810 A | 9/1999 | Star et al. | 372/108 |
| 5,968,383 A | 10/1999 | Yamazaki et al. | 219/121.75 |
| 5,979,523 A | 11/1999 | Puzio et al. | 144/286.5 |
| 5,995,230 A | 11/1999 | Madlener et al. | 356/375 |
| 5,996,460 A | 12/1999 | Waite | 83/520 |
| 6,023,071 A | 2/2000 | Ogura et al. | 250/586 |
| 6,035,757 A | 3/2000 | Caluori et al. | 83/520 |
| 6,076,445 A | 6/2000 | Kenyon et al. | 83/477.2 |
| 6,137,577 A | 10/2000 | Woodworth | 356/376 |
| 6,152,372 A | 11/2000 | Colley et al. | 235/472.01 |
| 6,209,597 B1 | 4/2001 | Calcote | 144/326 |
| 6,223,794 B1 | 5/2001 | Jones | 144/135.2 |
| 6,239,913 B1 | 5/2001 | Tanaka | 359/619 |
| 6,263,584 B1 | 7/2001 | Owens | 33/640 |
| 6,283,002 B1 | 9/2001 | Chiang | 83/477.1 |
| 6,301,997 B1 | 10/2001 | Welte | 81/54 |
| 6,328,505 B1 | 12/2001 | Gibble | 408/16 |
| 6,375,395 B1 | 4/2002 | Heintzeman | 408/16 |
| 6,413,022 B1 | 7/2002 | Sarh | 408/76 |
| 6,419,426 B1 | 7/2002 | Chalupa et al. | 408/1 R |

| | | | | |
|---|---|---|---|---|
| 6,460,768 B2 | 10/2002 | Ring et al. ............. 235/462.43 | | |
| D465,165 S | 11/2002 | Doyle et al. ................ D10/65 | | |
| 6,493,955 B1 | 12/2002 | Moretti ........................ 33/451 | | |
| 6,494,590 B1 | 12/2002 | Paganini et al. ............. 362/119 | | |
| 6,530,303 B1 | 3/2003 | Parks et al. .................... 83/473 | | |
| 6,536,536 B1 | 3/2003 | Gass et al. ...................... 173/2 | | |
| 6,546,835 B2 | 4/2003 | Wang ........................ 83/477.1 | | |
| 6,550,118 B2 | 4/2003 | Smith et al. ................ 29/26 A | | |
| 6,565,227 B1 | 5/2003 | Davis ......................... 362/119 | | |
| 6,584,695 B1 | 7/2003 | Chang ......................... 30/391 | | |
| 6,587,184 B2 | 7/2003 | Wursch et al. ............. 356/4.01 | | |
| 6,593,587 B2 | 7/2003 | Pease ..................... 250/559.19 | | |
| 6,621,565 B2 | 9/2003 | Pratt et al. ................ 356/141.4 | | |
| 6,644,156 B2 | 11/2003 | Villacis ........................ 83/425 | | |
| 6,647,868 B2 | 11/2003 | Chen ............................. 100/99 | | |
| 6,662,457 B2 | 12/2003 | Dameron ...................... 33/286 | | |
| 6,684,750 B2 | 2/2004 | Yu ............................... 83/473 | | |
| 6,688,203 B2 | 2/2004 | Chen ........................... 83/520 | | |
| 6,736,042 B2 | 5/2004 | Behne et al. ............... 83/440.2 | | |
| 6,736,044 B2 | 5/2004 | Chang .......................... 83/473 | | |
| 6,739,042 B2 | 5/2004 | Thorum ....................... 29/832 | | |
| 6,763,597 B2 | 7/2004 | Lysen .......................... 33/286 | | |
| 2001/0028025 A1 | 10/2001 | Pease ...................... 250/208.1 | | |
| 2001/0029819 A1 | 10/2001 | Okouchi ........................ 83/13 | | |
| 2001/0034951 A1 | 11/2001 | Sears ........................... 33/640 | | |
| 2001/0049988 A1 | 12/2001 | Ushiwata et al. ............. 83/520 | | |
| 2002/0000148 A1 | 1/2002 | Brun ............................ 83/520 | | |
| 2002/0054491 A1 | 5/2002 | Casas .......................... 362/119 | | |
| 2002/0059871 A1 | 5/2002 | Chen ........................... 100/35 | | |
| 2002/0131267 A1 | 9/2002 | Van Osenbruggen ....... 362/109 | | |
| 2002/0146295 A1 | 10/2002 | Schaer et al. ................ 408/16 | | |
| 2002/0164217 A1 | 11/2002 | Peterson .................... 408/1 R | | |
| 2002/0170404 A1 | 11/2002 | Peot et al. .................... 83/478 | | |
| 2003/0000355 A1 | 1/2003 | Butler et al. .................... 83/13 | | |
| 2003/0010173 A1 | 1/2003 | Hayden ........................ 83/520 | | |
| 2003/0027353 A1 | 2/2003 | Bright et al. ................ 436/173 | | |
| 2003/0029056 A1 | 2/2003 | Fung et al. ................... 33/626 | | |
| 2003/0101857 A1 | 6/2003 | Chuang ..................... 83/477.1 | | |
| 2003/0150312 A1 | 8/2003 | Chang .......................... 83/473 | | |
| 2003/0197138 A1 | 10/2003 | Pease et al. ........... 250/559.19 | | |
| 2003/0200851 A1 | 10/2003 | Yu ............................. 83/471.3 | | |
| 2003/0209678 A1 | 11/2003 | Pease ..................... 250/559.19 | | |
| 2003/0233921 A1 | 12/2003 | Garcia et al. ................. 83/520 | | |
| 2004/0032587 A1 | 2/2004 | Garcia et al. ............... 356/399 | | |

FOREIGN PATENT DOCUMENTS

| | | |
|---|---|---|
| CN | 2508922 Y | 9/2002 |
| CN | 2528568 Y | 1/2003 |
| CN | 2546122 Y | 4/2003 |
| DE | 2838968 | 3/1980 |
| DE | 3324428 | 1/1984 |
| DE | 3333428 | 4/1985 |
| DE | 3918070 | 12/1990 |
| DE | 4435573 | 4/1996 |
| DE | 19819332 | 11/1998 |
| DE | 19907880 | 8/2000 |
| DE | 10037532 | 2/2001 |
| EP | 0366039 | 5/1990 |
| EP | 0504745 | 3/1991 |
| JP | 55125954 | 9/1980 |
| JP | 61061705 | 3/1986 |
| JP | 61131246 | 6/1986 |
| JP | 61159312 | 7/1986 |
| JP | 62166914 | 7/1987 |
| JP | 62274738 | 11/1987 |
| JP | 63162143 | 7/1988 |
| JP | 08197381 | 8/1996 |
| JP | 10-109253 | 4/1998 |
| JP | 11-170203 | 6/1999 |
| JP | 200-225603 | 8/2000 |
| JP | 2000-225602 | 8/2000 |
| JP | 2000-317901 | 11/2000 |
| JP | 2001-150401 | 6/2001 |
| JP | 2001-157951 | 6/2001 |
| JP | 2001-158003 | 6/2001 |
| JP | 2001-300818 | 10/2001 |
| JP | 2001-300902 | 10/2001 |
| JP | 2001-347501 | 12/2001 |
| TW | 537083 | 12/1990 |
| TW | 517615 | 5/1991 |
| TW | 411888 | 11/2000 |

OTHER PUBLICATIONS

"Instruction Manual Redeye® 305mm (12") Compound Mitre Saw with Laser Line Generator, Model LMS305 ," GMC Global Machinery Company, 45-55 South Centre Road, Melbourne Airport, Victoria 3045, Australia; 19 pages.

"Instruction Manual Redeye® 2000W 250mm (10") Table Saw with Laser Line Generator, Model LS250TS," GMC Global Machinery Company, 45-55 South Centre Road, Melbourne Airport, Victoria 3045, Australia; 20 pages.

"Product Picks from the National Hardware Show"; Fall Homes 1992; Sep. 23, 1992; 2 pages.

"Delta, Building Trades and Home Shop Machinery"; Catalog published in Jan. 1993; (see generally pp. 5-25), 84 pages.

Craftsman Operator's Manual, "Laser Compound Miter Saw with Retractable Laser Trac® System, Model No. 137.212540," Part No. 137212540001; Sears, Roebuck and Co., Hoffman Estates, IL 60179; www.sears.com/craftsman; © Sears, Roebuck and Co.; 34 pages.

"Hitachi Model C 10FSH and C 10FSB Slide Compound Saw, Safety Instructions and Instruction Manual," issued by Hitachi Koki Co., Ltd., Shinagawa Intercity Tower A, 15-1, Konan 2-chrome, Minato-ku, Tokyo 108-6020, Japan; pp. 1-30, 88, 90, and 92; 33 pages.

Two (2) Images of Laserkerf Model 125; Laserkerf, 669 Burton Pike, Georgetown, KY 40324; www.laserkerf.com; 2 pages.

Four (4) Images of Hitachi Model C10FSH—255mm (10") Slide Compound Saw with Laser Marker; Hitachi Koki Co., Ltd., Shinagawa Intercity Tower A, 15-1, Konan 2-chrome, Minato-ku, Tokyo 108-6020, Japan; http://www.hitachi-koki.com/powertools/products/cutter/c10fsh/c10fsh.html; 5 pages.

One (1) Image of Hitachi Model C10FCH—255mm (10") Slide Compound Saw; Hitachi Koki Co., Ltd., Shinagawa Intercity Tower A, 15-1, Konan 2-chrome, Minato-ku, Tokyo 108-6020, Japan; http://www.hitachi-koki.com/powertools/products/cutter/c10fce/c10fce.html; 1 page.

One (1) Image ofCraftsman Model21206—Craftsman Professional Laser Trac™ 12 in. Sliding Compound Miter Saw; Sears Holding Corporation, 3333 Beverly Road, Hoffman Estates, IL 60179; http://www.sears.com/sr/javasr/product.do?BV_UseBVCookie=Yes&vertical=TOOL&fromAuto=YES&bidsite=CRAFT&pid=00921206000; 1 page.

One (1) Image of Craftsman Model 28060—Craftsman 15 amp Circular Saw with Laser Trac™ Laser Guide; Sears Holding Corporation, 3333 Beverly Road, Hoffman Estates, IL 60179; http://www.sears.com/sr/javasr/product.do?BV_UseBVCookie=Yes&vertical=TOOL&pid=00928060000; 1 page.

Five (5) Image of Craftsman Model 21209—Craftsman 10 in. Compound Miter Saw with LaserTrac™; Sears Holding Corporation, 3333 Beverly Road, Hoffman Estates, IL 60179; http://www.sears.com/sr/javasr/product.do?BV_UseBVCookie=Yes&vertical=TOOL&pid=00921209000&tab=des#tablink; 1 page.

Two (2) Images of GMC Model LMS305—305mm Compound Mitre Saw with REDEYE® Laser Line Generator; Global Machinery Company; 45-55 South Centre Road, Melbourne Airport, Victoria 3045, Australia; http://203.89.231.185/index.cfm?ppage=products&pproduct_uuid=B695359F-AB36-4219-AB89F2C2FE9B78B8; 3 pages.

Two (2) Images of Rockwell Model RW2115L—7 1/4" Laser Circular Saw; Rockwell Tools; 866-748-6657; http://www.rockwelltools.com/pages/1/index.htm; 3 pages.

* cited by examiner

SYSTEM FOR RAPIDLY STOPPING A SPINNING TABLE SAW BLADE

CROSS-REFERENCE TO RELATED APPLICATIONS

The present application is a continuation-in-part of U.S. patent application Ser. No. 10/836,132 filed Apr. 29, 2004 now abandoned, which in-turn claims priority under 35 USC §119(e) to provisional U.S. Application No. 60/466,199 filed Apr. 29, 2003. In addition, the present application claims priority entitled under 35 U.S.C. §119(e) to provisional U.S. Application No. 60/533,192 filed Dec. 30, 2003. Said U.S. patent application Ser. No. 10/836,132 and U.S. Provisional Patent Application 60/466,199 and 60/533,192 are herein incorporated by reference in their entirety.

FIELD OF THE INVENTION

The present invention relates generally to the field of saws and more particularly to a detection system and method for rapidly stopping a spinning saw blade.

BACKGROUND OF THE INVENTION

There exists a need for an effective method to rapidly stop a spinning saw blade in response to input from a sensing device that detects possible contact of the blade with a user's hand. Currently, various methods of stopping a saw blade under such conditions are available. For example, some methods employ a brake which makes contact with the blade and causes the blade to drop below the table surface if the user's hand has made contact with the saw blade. Additional methods utilize a three-in-one system including a splitter, anti-kickback fingers and a blade cover.

All of the presently available systems and methods have one or more disadvantages in terms of convenience of use, early and effective detection of a user's hand and cost. For instance, the system which employs a brake mechanism destroys the saw blade when used. Further, such system requires contact be made between the user and the blade prior to activation of the braking mechanism.

Therefore, it would be desirable to design a system and a method for stopping a rapidly spinning table saw blade overcoming the aforementioned limitations of inflexibility and required user/saw blade contact thereby resulting in an efficient, flexible, early to detect stopping system.

SUMMARY OF THE INVENTION

In a first aspect of the invention, a system for stopping a spinning saw blade is disclosed. Such system is comprised of a pin assembly disposed adjacent to a saw blade assembly for stopping a spinning saw blade. A receiving block is disposed on a side of the saw blade assembly opposing the pin assembly for receiving the tip of the pin assembly. A driving assembly is coupled to the pin assembly for driving the pin assembly into the spinning saw blade into the receiving block. Finally, a sensing assembly is coupled to at least one of the saw blade assembly and the driving assembly for sensing encroachment of a user's hand in a pre-defined zone. In use, upon sensing a user's hand the sensing assembly signals the driving assembly to stop the spinning saw blade by driving the pin assembly through the saw blade and into the receiving block. In additional embodiments of the present invention, the sensing assembly includes shape recognition technology. Further, the pin assembly is actuated by an explosive substance wherein the explosive substance is contained within a replaceable cartridge.

In a second aspect of the invention, a method for stopping a rapidly spinning saw blade is disclosed. Such method is comprised of detecting a user's hand in a pre-defined zone by a detecting system and driving a pin assembly through the saw blade into a receiving block to stop the saw blade from spinning upon detecting the presence of a user's hand.

BRIEF DESCRIPTION OF DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring in general to FIGS. 1-6, a detection system for rapidly stopping a spinning saw blade in response to input from a sensing device that detects possible contact of the blade with a user's hand is disclosed. In use, upon sensing a user's hand in a pre-defined zone, a sensing assembly signals a driving assembly to stop the rapidly spinning saw blade by driving a pin assembly through the saw blade and into a receiving block. In one embodiment, the detection system becomes activated prior to a user's hand making contact with the saw blade which is a major advantage over the prior art which requires such contact. Further, the detection system is positioned to allow an workspace on the table top surface to be unobstructed. In additional embodiments, the pin assembly is actuated by an explosive or detonation substance which may be easily replaced after use. As such, the instant invention overcomes the limitations of partial blade disintegration, inflexibility and required user/saw blade contact and thus, yields an efficient, flexible, early to detect stopping system.

Figure 1:
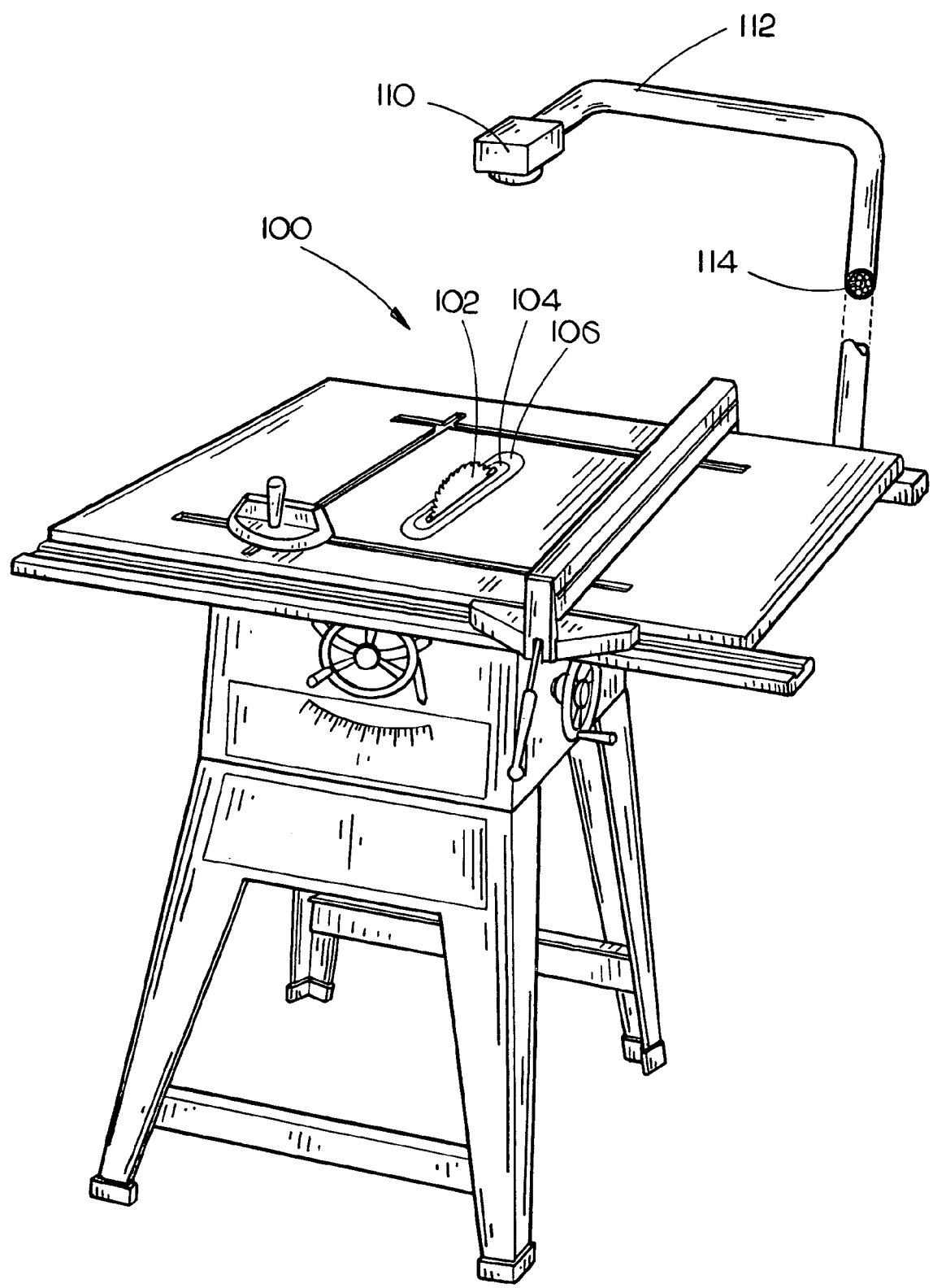
FIG. 1 is an isometric view of a table saw including a sensing assembly in accordance with an exemplary embodiment of the present invention, wherein the sensing assembly includes a video proximity device for detecting a user's hand in a pre-defined zone.
Figure 2:
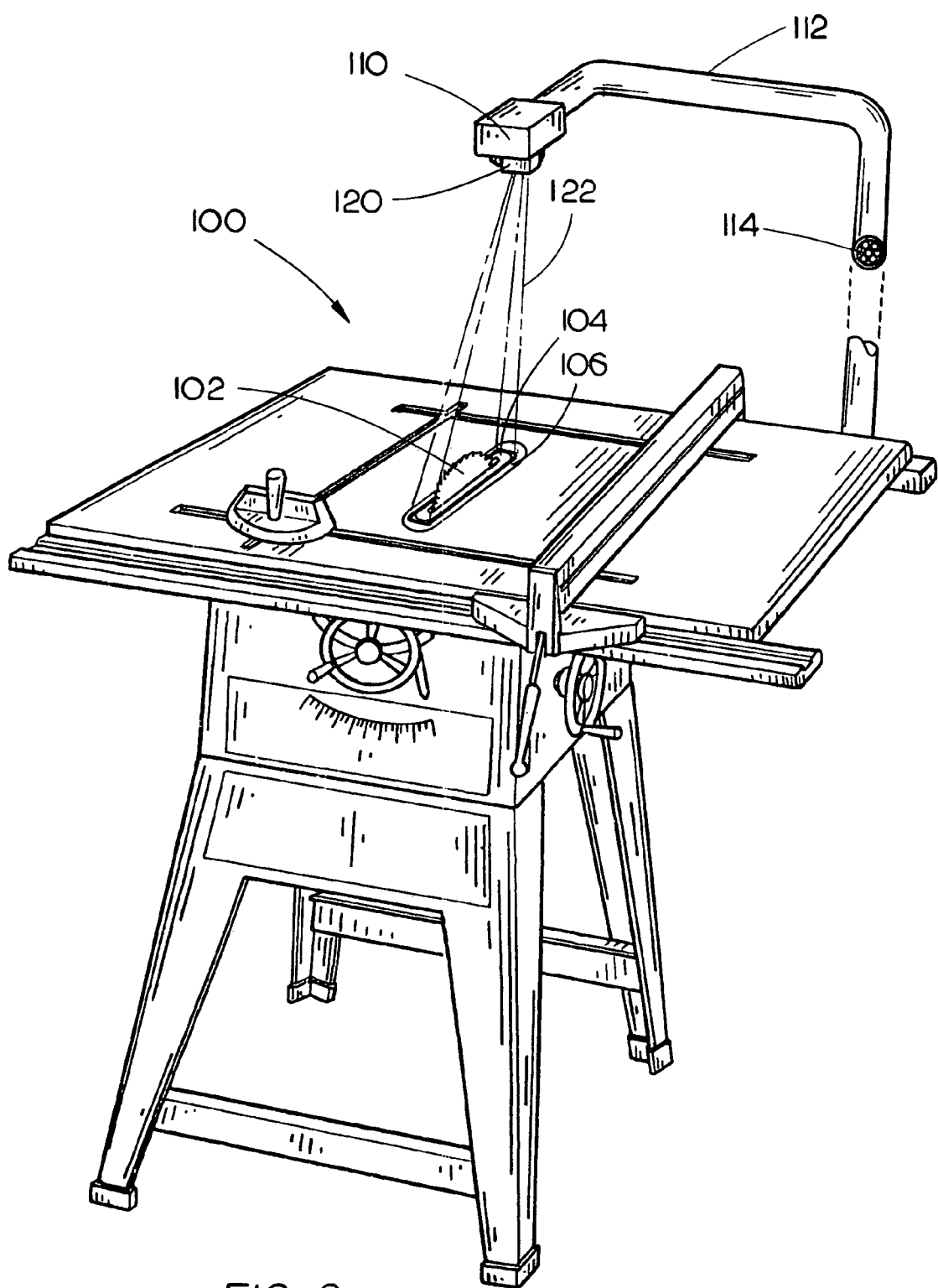
FIG. 2 is an isometric illustration in accordance with the video proximity device provided in FIG. 1, wherein the video proximity device further includes a laser.
Figure 3:
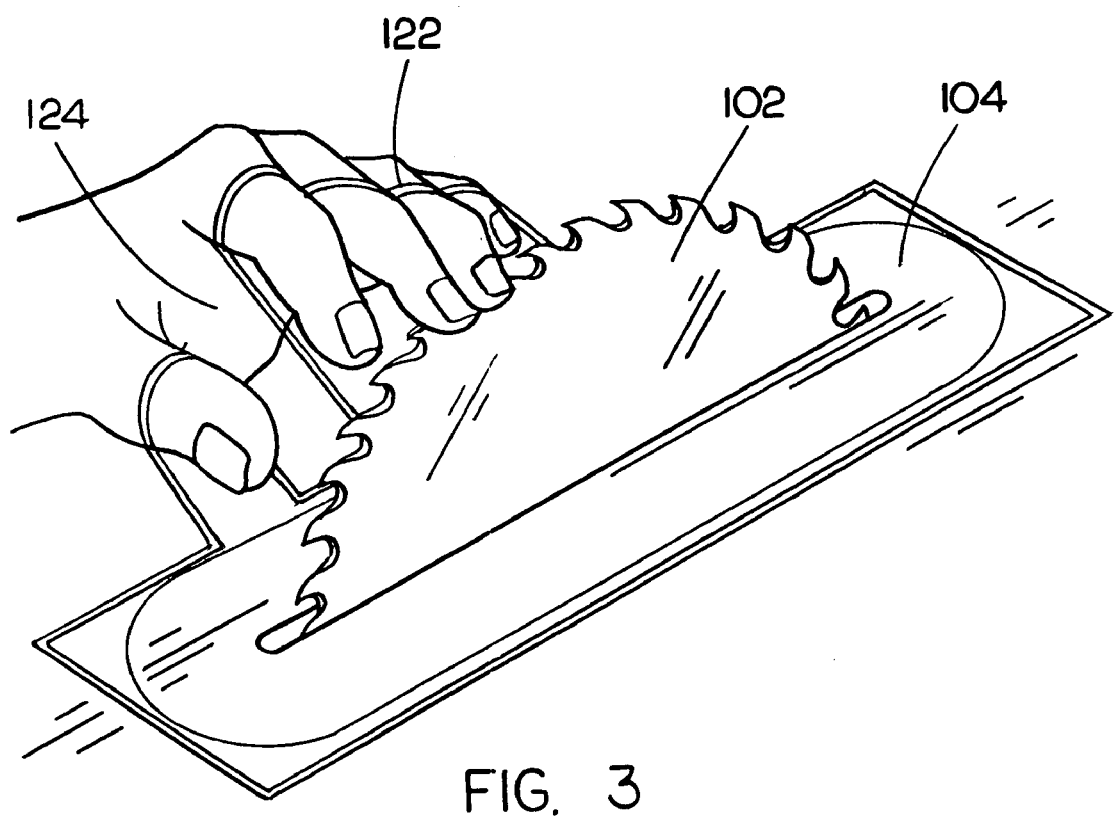
FIG. 3 is an exploded, isometric view of the table saw shown in FIG. 2, illustrating the indication by a laser beam, visible on the hand of the operator, that encroachment into a predefined zone has occurred.

Referring in general to FIGS. 1-3, an exemplary embodiment of a sensing assembly included within the instant detection system is disclosed. The sensing assembly is for sensing encroachment of a user's hand in a pre-defined zone. In the present embodiment, the sensing assembly is coupled to the saw blade and the driving assembly (not shown, see FIGS. 4-6). Further, in the exemplary embodiment, the sensing assembly is comprised of a video proximity device. The video proximity device may detect the presence of a human body part, such as a human hand and the like, in a predefined zone or point about the working tool element of a power tool. Moreover, in an exemplary embodiment of the present invention, the video proximity device is configured to distinguish between a workpiece, like wood, within the predefined zone or point, and a human body part. The presence of a body part in the predefined zone or point is detected through the use of a video camera positioned for a clear view of the working tool element and the adjacent area. Should a body part enter this zone or point, the sensing assembly initiates appropriate countermeasures to prevent contact. For example, the sensing assembly directs the driving assembly to drive the pin assembly into the saw blade to stop the spinning of such blade. In addition to or in the alternative of stopping the saw blade, the sensing assembly causes power to the saw assembly to be shut-off or for the blade to be mechanically moved away from the user, and the like for preventing contact between the user and working tool.

The video proximity device may utilize a number of different techniques for detecting the presence of a human body part. In one embodiment, the video from the video proximity device is analyzed by an information handling system (e.g. a computer) having pattern recognition hardware or software for identifying the unique shapes and patterns of human body parts, as differentiated from the shapes and patterns of a workpiece. For example, a human hand is comprised of a series of rounded edges, while a workpiece generally includes linear edges. In another embodiment, an information handling system includes motion analysis hardware or software capable of detecting the movement of a human body part, as differentiated from the movement of a workpiece. For example, a human hand moves in a non-linear, or somewhat erratic, manner, while a workpiece is directed in a line parallel to the orientation of a tool element. In a further embodiment, the video camera comprises a thermal imaging camera, capable of distinguishing the heat signature of a human body part from the heat signature of a workpiece. For example, a human body part is typically of a higher temperature than the temperature of a workpiece in the same environment, and thus is distinguishable by such a system. It should be noted that one of skill in the art may contemplate other video processing and recognition techniques without departing from the scope and intent of the present invention.

The video proximity device may be positioned in a number of different orientations in order to provide a substantially unobstructed view of the working tool element and the adjacent area. In one embodiment, the video proximity device is mounted on an assembly above the support surface. For example, in the case of a table saw, a video camera is mounted on a support assembly above the saw blade, providing a view of the blade and surrounding area. In another embodiment, the video proximity device is mounted to the power tool itself. For example, in the case of a table saw, a video camera is mounted in the fence of the table saw, providing a generally unobstructed view of the blade and surrounding area. Additionally, fiber optic cameras may be desirable in order to minimize intrusion and the like.

The video proximity device may be employed in concert with various systems for alerting the operator of their encroachment into a predefined zone or point. In one embodiment, the support surface of the power tool is clearly marked to indicate the limits of one or more predefined zones. For example, in the case of a table saw, a "red zone" is clearly marked on the support surface, indicating that if an operator's body part encroaches into this zone, the saw blade will be stopped by driving a pin assembly into the side of the saw blade. It should be noted that more than one zone may be defined, and the video proximity device may be capable of distinguishing encroachment into different zones. This may serve not only to provide an additional signal to the operator, but also to minimize the situations in which the pin assembly is actuated. In the case of the table saw, the red zone is surrounded by a caution zone or "yellow zone," for example. If an operator's hand encroaches into the caution/ yellow zone, power to the motor driving the saw blade or the working tool is terminated, or the tool is moved below a support surface, causing no permanent damage to the saw blade. Such a configuration may have the added benefit of providing a gradual slowdown for the working tool element. In the case of a table saw utilizing a yellow zone/red zone combination, for example, initially slowing the saw blade in the yellow zone allows the blade to be stopped more quickly and more effectively in the red zone, reducing potential harm to an operator and to the power tool.

In another embodiment of the sensing assembly, a laser device is used with the video proximity device for clearly marking the boundaries of a zone. In one embodiment, the laser device projects a beam of visible light onto the support surface/workpiece, indicating to an operator the limits of the zone. This configuration provides the added benefit of visually indicating to the operator encroachment into the zone outlined by the beam, which may appear on the encroaching part of the operator's body.

Referring specifically to FIG. 1, a video proximity device is shown for a table saw assembly 100 in accordance with an exemplary embodiment of the first aspect of the present invention. The table saw assembly 100 includes a saw blade 102 surrounded by a red zone 104 and a caution zone/yellow zone 106. A video camera 110 is located directly above the table saw assembly 100, mounted on a support assembly 112. The support assembly 112 provides passage for cables 114 associated with the video camera 112. These cables supply power to the video camera 110 and connect the output of the video camera 110 to a computer or processor having hardware or software for discerning the presence of a human body part in the zones. Upon encroachment of a body part into the yellow zone 106, action is taken by the table saw assembly 100 to stop the saw blade 102. This action may include eliminating power to a motor driving the saw blade 102. Upon encroachment of a body part into the red zone 104, action is taken by the table saw assembly 100 directed toward stopping the saw blade 102 in a more definite manner. For example, a pin assembly 126 is directed into the saw blade 102 or the saw blade 102 is removed to below the support surface of the table saw assembly 100.

Referring specifically to FIG. 2, a video proximity device is shown for a table saw assembly 100 in accordance with an exemplary embodiment of the present invention. The table saw assembly 100 includes a saw blade 102 surrounded by a red zone 104 and a yellow zone 106. A video camera 110 is located directly above the table saw assembly 100, mounted on a support assembly 112. The support assembly 112 provides passage for cables 114 associated with the video camera 112. These cables supply power to the video camera 110 and connect the output of the video camera 110 to a information handling system having hardware or software for discerning the presence of a human body part in the red zone 104 and the yellow zone 106. A laser device 120 is included with the video camera 110 and projects a laser beam 122 onto the workpiece/support surface of the table saw assembly 100. Upon encroachment of a body part into the yellow zone 106, an operator is visually cued by the reflectance of the laser beam 122 from a body part encroaching into the zone, and action may be taken by the table saw assembly 100 to stop the saw blade 102. For example, such action includes terminating power to a motor powering the saw blade 102. Further, upon encroachment of a body part into the red zone 104, action is taken by the table saw assembly 100 directed toward stopping the saw blade 102 in a more definite manner. For example, the pin assembly 126 is directed into the saw blade 102 or the saw blade 102 is dropped below the support surface of the table saw assembly 100.

Referring specifically to FIG. 3, a laser beam 122 is shown contacting a body part 124 encroaching into a red zone 104 in accordance with a first aspect of the present invention. The laser beam 122 may serve as a visual cue to the operator that encroachment into the red zone 104 has occurred. It should be noted that the area enclosed by the laser beam 122 may correspond with the red zone 104, the yellow zone 106 (See FIGS. 1 and 2), or any number of predefined zones or points. It should also be noted that an operator of a power tool utilizing a video proximity device may define the area of a zone dynamically, and the laser beam 122 may be used to indicate the boundaries of such a zone. It should further be noted that a number of laser beam generating devices may be used to indicate a number of different zones, as contemplated by one of skill in the art.

In the alternative to the sensing assembly including a video proximity device, such assembly may recognize the difference in the electrical properties of wood and a user whereby the system projects a high-frequency electrical signal on the saw blade and monitors changes in the signal such as by utilizing one of the assemblies presently known in the art. For example, under normal operating conditions, the signal would remain unaltered for wood includes a relatively small inherent electrical capacitance and conductivity and therefore, the presence of wood in the electrical field would not result in an alteration of such field. However, if a user's hand made contact with the saw blade 102, the detection system 100 would be activated by the sensing assembly detecting a change in the electrical signal as a result of the relatively large inherent capacitance of the user's body. For instance, contact detection electrodes are coupled to the saw blade to detect fluctuations in capacitance.

Figure 4:
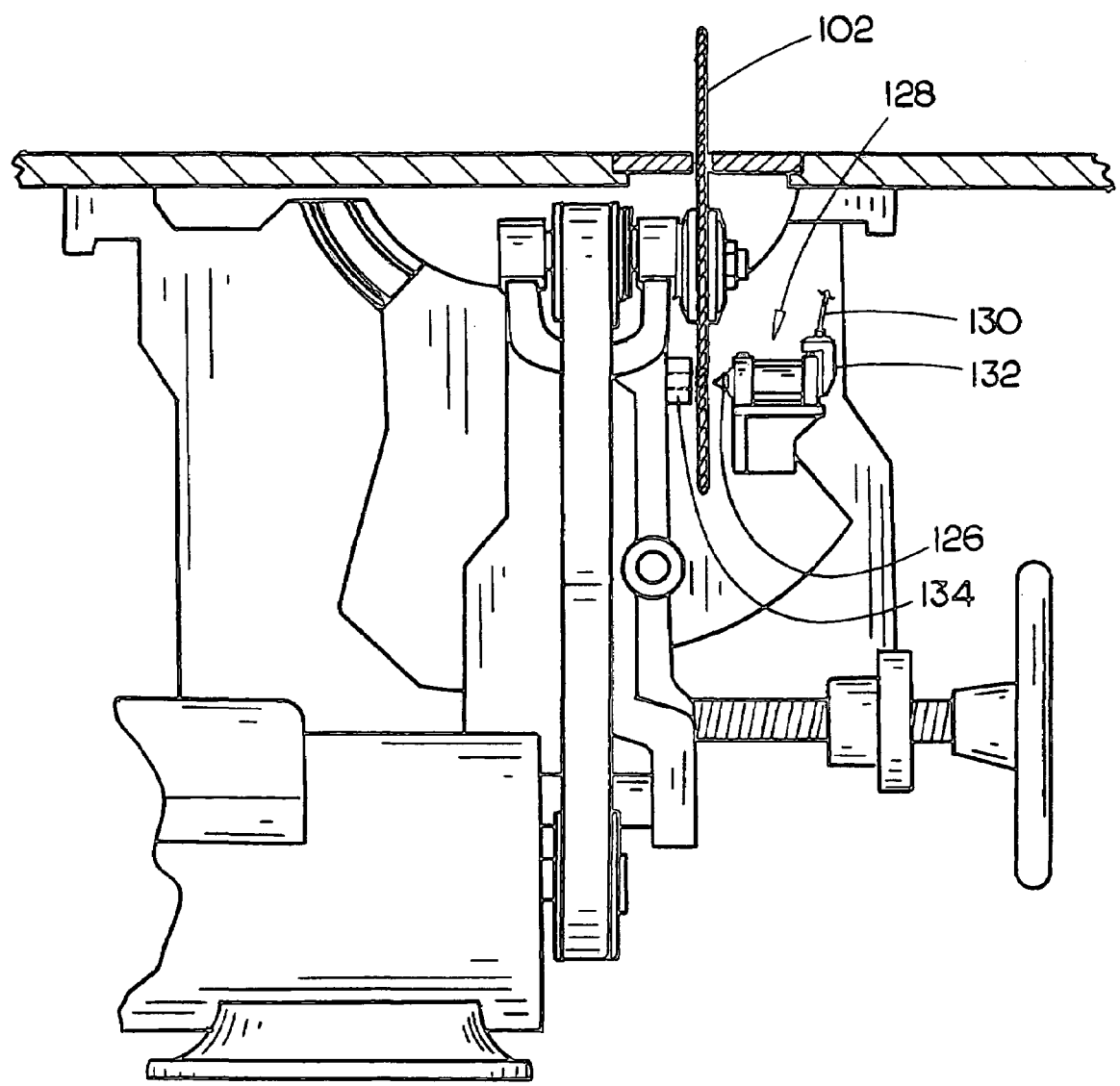
FIG. 4 is a front view of a table saw in accordance with an exemplary embodiment of the present invention, wherein the components of the detection system located beneath the table top of the table saw are illustrated.
Figure 6:
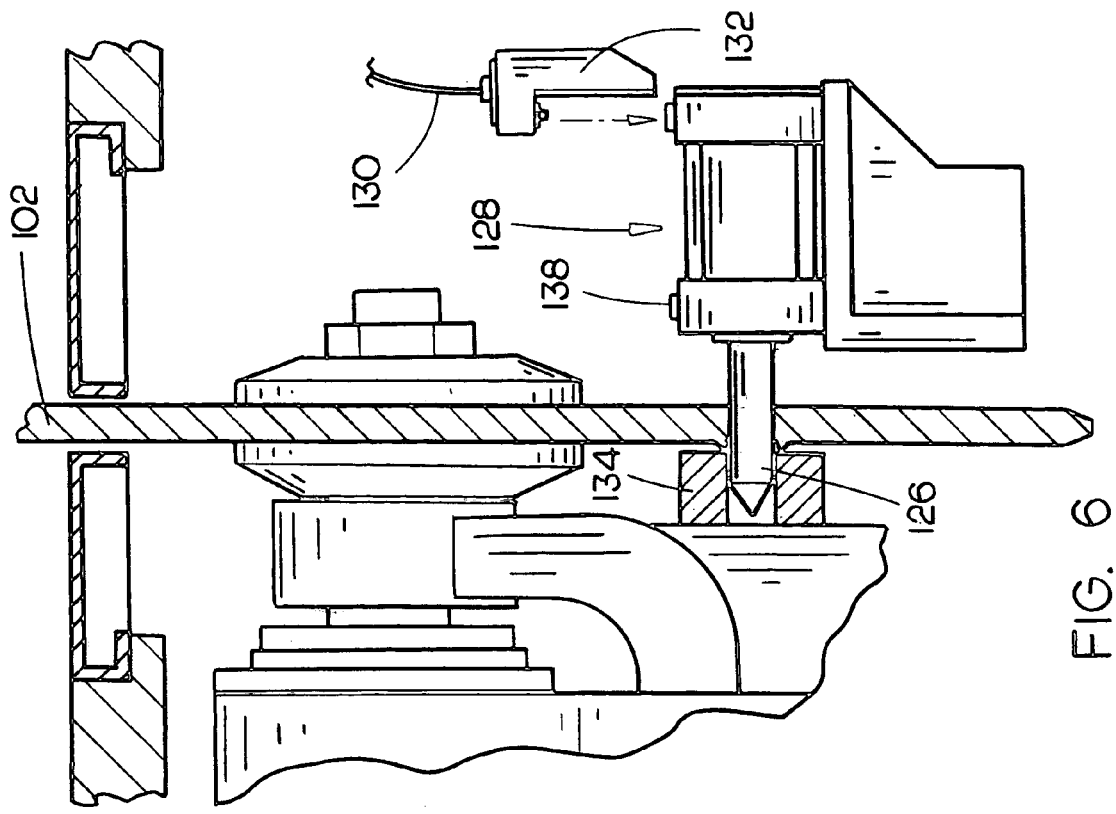
FIG. 6 is an exploded partial view of the table saw illustrated in FIG. 4, wherein the pin assembly has been actuated.
Figure 5:
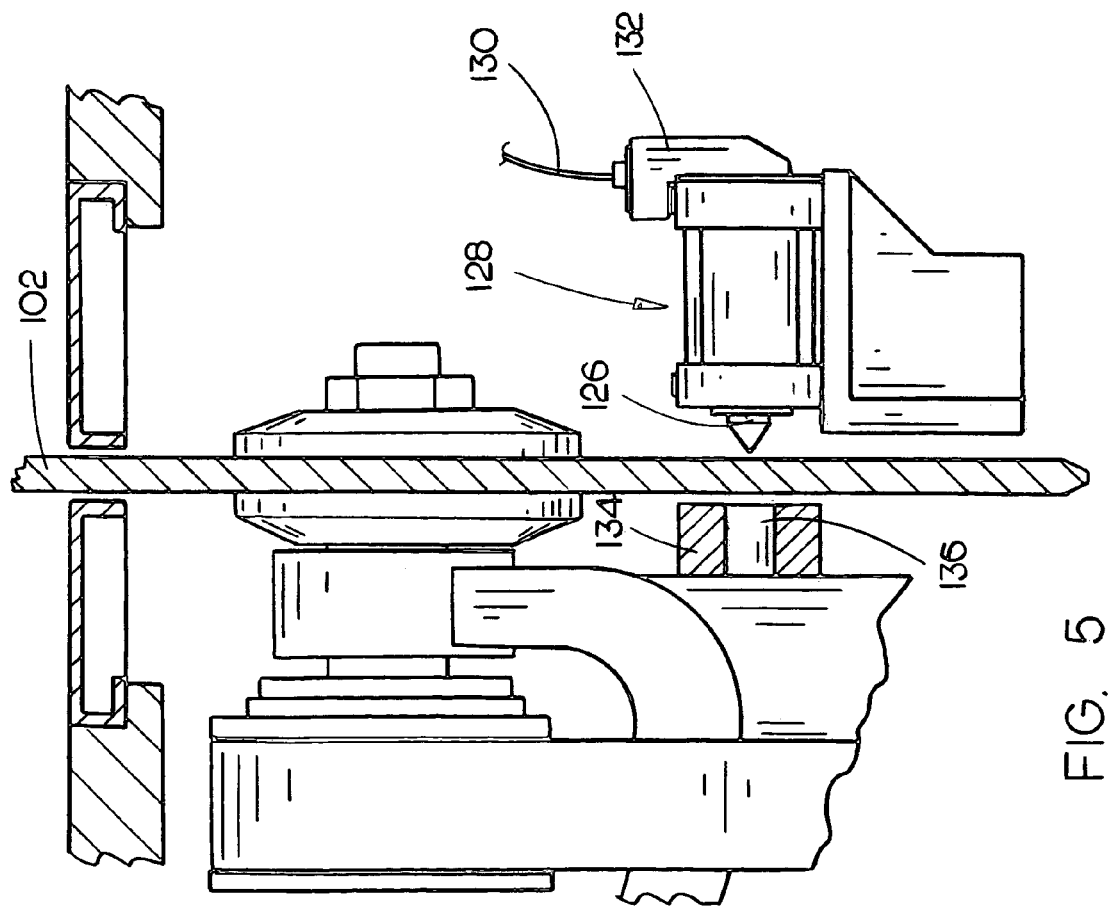
FIG. 5 is an exploded partial view of the table saw illustrated in FIG. 4, wherein the pin assembly is retracted.

As illustrated in FIGS. 4 through 6, the stopping system disclosed in the instant invention includes a pin assembly 126. The pin assembly 126 is disposed on a first side of the saw blade 102 for stopping a spinning saw blade. Further, the pin assembly 126 includes a first end. In one embodiment, the first end includes a pointed tip for piercing the saw blade. In additional embodiments, the pin assembly 126 is comprised of heat-treated steel thereby increasing the strength and durability of the pin assembly 126. It is contemplated that additional materials including steel or other metals may be utilized without departing from the scope and spirit of the present invention. Moreover, the size and shape of the pin assembly 126 may vary depending upon the size and dimensions of the saw blade 102 which is to be pierced; however, preferably, such variation will be limited to that which will not result in the significant disintegration of the saw blade 102. For example in stopping systems employing a pawl or shoe which is forced into the teeth of a spinning blade, engagement of the pawl or shoe with the blade may cause separation of some of the teeth from the body of the saw blade. However, in the stopping system of the present invention, the pin assembly 126 pierces the body of the saw blade, stopping the blade instantaneously, without causing separation of saw teeth from the blade 102.

In addition to the pin assembly 126, the stopping system includes a driving assembly 128. In an exemplary embodiment, the driving assembly 128 is coupled to the pin assembly 126 for driving the pin assembly 126 into the spinning saw blade 102. Further, the driving assembly 128 includes a communication system which allows the driving assembly 128 to communicate with the sensing assembly. For example, the driving assembly 128 may be hard-wired 130 to the sensing assembly as demonstrated in FIG. 4. In additional embodiments, the driving assembly 128 may be activated by the sensing assembly via an optical signal from the sensing assembly.

Moreover, in an exemplary embodiment of the present invention, an explosive or capable of detonation substance is coupled to a piston which upon actuation causes the pin assembly 126 to be propelled into the spinning saw blade. The explosive actuated pin assembly 126 results in such assembly making an instantaneous forced entry into the saw blade 102 causing the saw blade 102 to stop spinning immediately. As such, in one embodiment, the explosive substance is contained in a replaceable cartridge 132 (e.g. a blank cartridge including a .22 or a .27 caliber load). In additional embodiments, the drive assembly 128 may be electromagnetic, mechanical (e.g. a spring system or mallet activated), or the like. It will be appreciated that activation of the pin assembly 126 by the drive assembly 128 will generally require the replacement of the explosive substance (e.g. the replaceable cartridge, 132). However, use of a replaceable cartridge system will allow a user to easily replace the explosive substance prior to resuming use of the saw.

In a further embodiment of the present invention, a receiving block 134 is disposed on the second side of the saw blade 102 for receiving the tip of the pin assembly 126. In one exemplary embodiment, as illustrated in FIGS. 5 and 6, the receiving block 134 includes an aperture 136 for receiving the tip of the pin assembly 126. Use of the aperture 136 allows the pin assembly 126 to be received by the receiving block 134 while minimizing the damage to the pin assembly 126 due to interaction with the receiving block 134. Further, the receiving block 134 may be formed of any suitable metal including steel, heat-treated steel, or the like so that contact by the pin assembly 126 does not destroy the receiving block 134.

FIGS. 5 and 6 illustrate the pin assembly in either a retracted position or an actuated position, respectively. In FIG. 5, the pin assembly 126 is in the retracted position and the replaceable cartridge 132 is ready for use. In an exemplary embodiment, upon sensing a user's hand or other body part in a predefined zone, the sensing assembly (see FIGS. 1-3) directs the driving assembly 128 to drive the pin assembly 126 into the rapidly spinning saw blade 102. The driving assembly 128 actuates the pin assembly 126 by firing the explosive substance contained in the replaceable cartridge 132 causing the instantaneous firing of the pin assembly 126 through the saw blade 102 into the receiving block 134. As illustrated in FIG. 6 and as discussed previously, the receiving block 134 may be configured with an aperture 136 for receiving the pin assembly 126. In an exemplary embodiment, the size and shape of the aperture 136 corresponds to that of the pin assembly 126.

In an additional embodiment, the pin assembly 126 may be retracted from the saw blade 102 and the receiving block 134 by blowing compressed air through a port hole 138 located within the drive assembly 128. Such port hole 138 also functions as an exit for the air generated during the release of the explosive substance.

In still a further embodiment, the detection system 100 may include a self-check feature whereby each time the table saw is turned on, the detection system 100 performs a system check to ensure that the system is properly working. If the system is not properly working, the user may be notified by a warning signal including flashing lights or power being cut to the motor. In an additional embodiment, the detection system 100 may include a bypass feature which would allow the system to be turned off if necessary. For example, if the sensing assembly is triggered by detecting a difference in capacity, if a user desires to cut a piece of metal with such saw it would be preferable to turn-off the detection system. The detection system may be set-off unnecessarily whereby the capacitance of a piece of wood is much less than that of a piece of metal and thus, the system may sense a change in capacitance due to the type of material being cut not because of entry of a users hand into a predefined zone. Those of skill in the art will appreciate that while the present drawings illustrate the present invention in use on a table saw, such invention may be adapted to be coupled to variety of power tools including a miter saw, chop saws, radial arm saws, circular saw, and the like without departing from the scope and spirit of the present invention.

Figure 7:
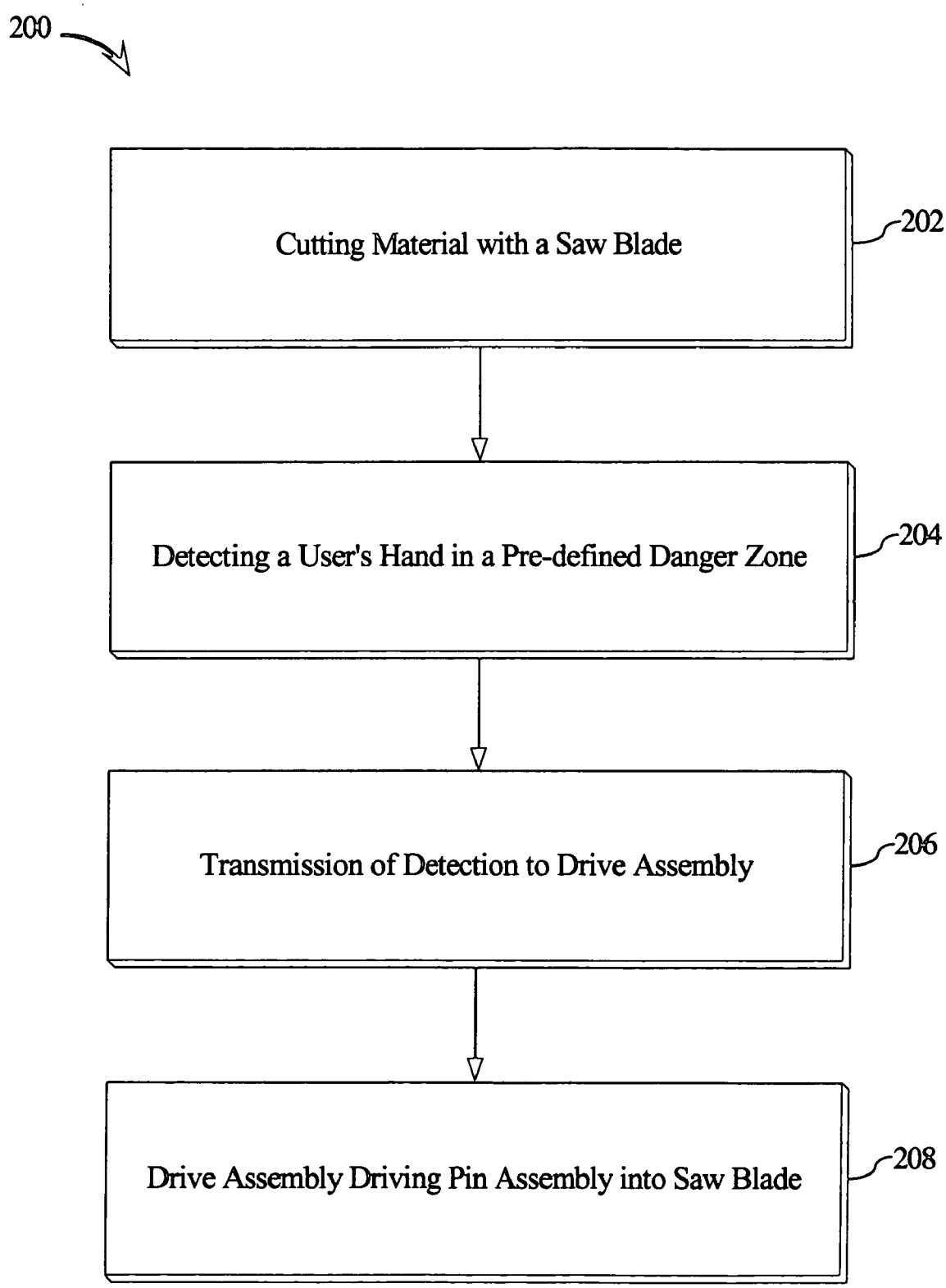
FIG. 7 is flow chart illustrating a method for stopping a rapidly spinning table saw in accordance with the present invention.

In addition to the detection system, a method for stopping a spinning saw blade 200 is disclosed. As illustrated in FIG. 7, such method is comprised of cutting material with a saw blade 202. Upon detecting a user's hand in a pre-defined work zone by a detecting system 204, the detecting system including a sensing device, a drive assembly, a pin assembly and a receiving block transmits directions from the sensing device to the drive assembly to drive the pin assembly into the saw blade 206. The drive assembly then drives the pin assembly 124 through the saw blade 104 into the receiving block 130 to stop the saw blade 104 from spinning 208. It is contemplated that the instant method 200 may be utilized with a number of different power tools including a miter saw, circular saw, chop saws, radial arm saws, table saw, and the like.

In FIGS. 1 though 6, the table saw assembly 100 is illustrated without a blade guard assembly (e.g., a three-in-one system) for purposes of illustration only. Thus, FIGS. 1 through 6 are not intended to indicate that the table saw assembly 100 should be manufactured without a blade guard assembly or operated with the blade guard assembly removed. Instead, it is contemplated that the system and method for rapidly stopping a spinning table saw blade of the present invention may be implemented within a table saw assembly 100 employing a blade guard assembly such as a three-in-one system, or the like, to augment the blade guard assembly during operation of the table saw assembly 100. Such implementation would not depart from the scope and intent of the present invention.

It is believed that the present invention and many of its attendant advantages will be understood by the foregoing description, and it will be apparent that various changes may be made without departing from the scope and spirit of the invention or without sacrificing all of its material advantages. The form herein before described being merely an explanatory embodiment thereof, it is the intention of the following claims to encompass and include such changes.

Further, it is understood that the specific order or hierarchy of steps in the methods disclosed are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

What is claimed:

1. A system for stopping a spinning saw blade, comprising:
    a pin assembly disposed adjacent to a saw blade assembly for stopping the spinning saw blade, the pin assembly including a first end, the first end including a pointed tip for piercing the saw blade;
    a receiving block disposed on a side of the saw blade opposing the pin assembly for receiving the tip of the pin assembly;
    a driving assembly coupled to the pin assembly for driving the pin assembly into the spinning saw blade and into the receiving block; and
    a sensing assembly coupled to at least one of the saw blade assembly and the driving assembly for sensing encroachment of a user's hand in a pre-defined zone,
    wherein upon sensing a user's hand the sensing assembly signals the driving assembly to stop the spinning saw blade by driving the pin assembly through the saw blade and into the receiving block.

2. The detection system of claim 1, wherein the sensing system comprises a video proximity device.

3. The system for stopping a spinning saw blade of claim 1, wherein the sensing assembly comprises a laser device.

4. The system for stopping a spinning saw blade of claim 1, wherein the sensing assembly comprises a sensor for detecting the difference between the electrical capacitance of a user's hand and a workpiece.

5. The system for stopping a spinning saw blade of claim 1, wherein the sensing assembly comprises a sensor for detecting the difference between the electrical resistance of a user's hand and a workpiece.

6. The system for stopping a spinning saw blade of claim 1, wherein the sensing assembly recognizes the differences between the shapes of human body parts and a workpiece.

7. The system for stopping a spinning saw blade of claim 1, wherein the pin assembly is actuated by a pyrotechnic device.

8. The system for stopping a spinning saw blade of claim 6, wherein the pyrotechnic device is included within a replaceable cartridge.

9. The system for stopping a spinning saw blade of claim 1, wherein the receiving block includes an aperture for receiving the pin assembly.

10. The system for stopping a spinning saw blade of claim 1, wherein the pin assembly is formed of hardened steel.

11. A saw, comprising:
    a pin assembly disposed adjacent to a saw blade assembly, the saw blade assembly being configured for receiving a saw blade, the pin assembly including a first end, the first end including a pointed tip for piercing the saw blade;
    a receiving block disposed on a side of the saw blade opposing the pin assembly for receiving the tip of the pin assembly;

a driving assembly coupled to the pin assembly for driving the pin assembly into the saw blade and into the receiving block; and a sensing assembly coupled to at least one of the saw blade assembly and the driving assembly for sensing encroachment of a user's hand in a pre-defined zone, wherein upon sensing a user's hand the sensing assembly signals the driving assembly to stop the saw blade by driving the tip of the pin assembly through the saw blade and into the receiving block.

* * * * *